United States Patent [19]

Haas

[11] Patent Number: 4,526,820

[45] Date of Patent: Jul. 2, 1985

[54] ORNAMENTAL MARKER FOR VEHICLE ANTENNAS

[76] Inventor: Michael F. Haas, 3150 Palm Dr., No. 48, Fullerton, Calif. 92631

[21] Appl. No.: 615,829

[22] Filed: May 31, 1984

[51] Int. Cl.$^3$ .............................................. B60R 13/00
[52] U.S. Cl. ...................................... 428/31; 40/591; 116/28 R; 220/4 E
[58] Field of Search ................. 220/4 E, 339; 40/591, 40/592; 428/31; 116/28 R, 209

[56] References Cited

U.S. PATENT DOCUMENTS

| | | | |
|---|---|---|---|
| 3,526,050 | 9/1970 | Weller | 40/591 |
| 3,712,263 | 1/1973 | Faragosa | 40/591 X |
| 4,006,818 | 2/1977 | Wannyn | 206/486 X |
| 4,038,552 | 7/1977 | Ciofalo | 116/209 X |
| 4,417,613 | 11/1983 | Ryan et al. | 220/4 E X |

*Primary Examiner*—Henry F. Epstein
*Attorney, Agent, or Firm*—Francis X. LoJacono

[57] ABSTRACT

This invention provides a combination ornament and identification device for vehicles formed so as to be fixedly secured to the radio antenna of a vehicle. The device includes a pair of engageable marker members, each being formed having a longitudinal channel to encompass the antenna, and including an enlarged recess disposed as part of the channel so as to receive the enlarged tip end of the antenna therein. An adhesive material is provided on the inner mating surfaces of the marker members so as to fixedly secure the markers in position about the antenna. The outer surfaces of the marker members are provided with identifiable indicia, either printed thereon or integrally formed as part of the surface, thus establishing an identifiable ornamental device that can be readily viewed or seen from a distance.

11 Claims, 6 Drawing Figures

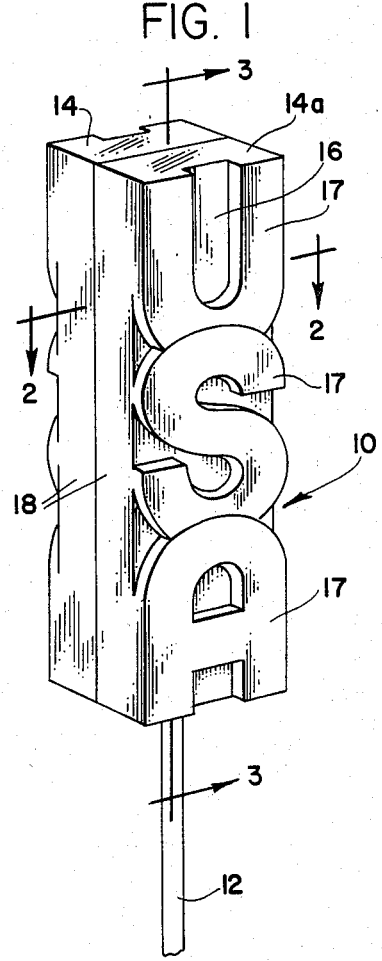
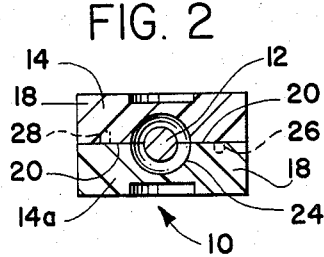
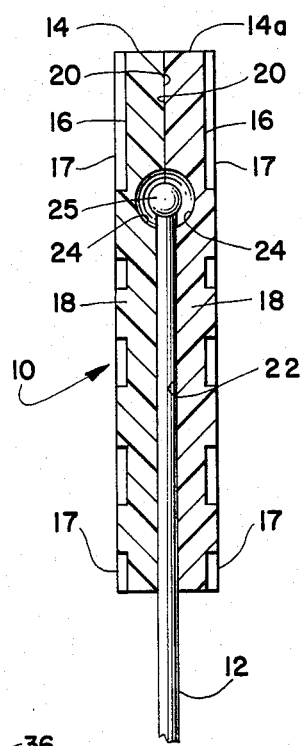
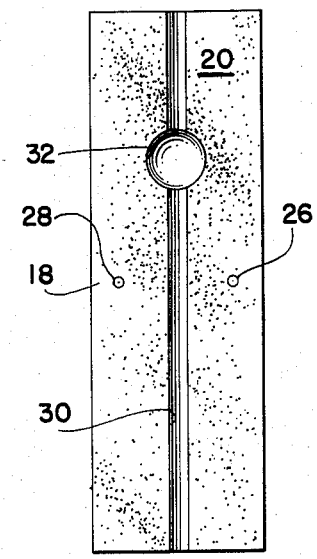
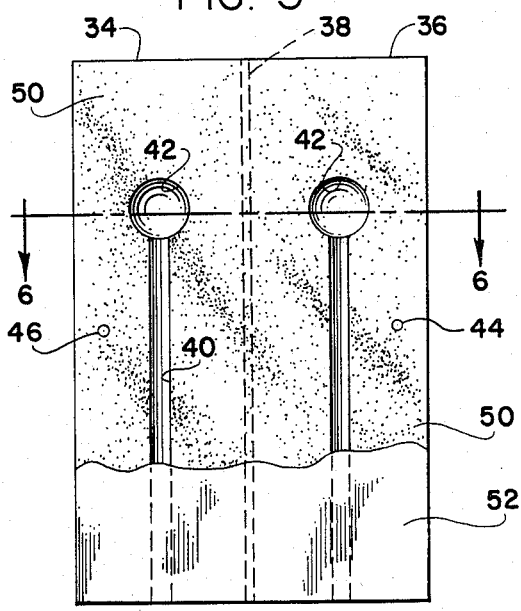
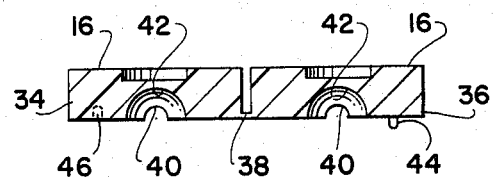

ORNAMENTAL MARKER FOR VEHICLE ANTENNAS

BACKGROUND OF THE INVENTION

This invention relates generally to an ornamental attachment for vehicle antennas, and more particularly to an ornament defining a vehicle-identification marker.

There are many known ornaments that have beem employed for attachment to antennas of cars or other vehicles. However, some of these devices are limited in their uses, and others have features that restricted their applications to particular situations or circumstances.

As for an ornament to be mounted to a vehicle antenna, the applicant is only aware of a ball-like device made from a solid piece of expanded polystyrene having a central bore. The ball is force-fitted over the enlarged tip end of the antenna. This causes the bore to enlarge as the enlarged tip is pushed to the full depth of the central bore. Thus, after a short period of time, the area of the plastic material becomes weak, eventually allowing the ornament to be blown free as the vehicle moves along a street or highway. Another problem is that it is very easily removed or stolen.

Accordingly, the present invention is so designed as to provide a vehicle ornament that is particularly adapted to be fixedly secured to an antenna, without the chance of being removed or inadvertently lost while the vehicle is moving at a high rate of speed.

Another object of the invention is to provide a vehicle-identification marker in combination with an ornament.

Still another object of the invention is to provide an ornament of this type that comprises a pair of marker members, the outer sides of which have suitable markings or configurations for the purpose of identification, the inner mating surfaces being adapted to be fixedly secured to each other about the shaft of the antenna.

A further object of the present invention is to provide an ornament for a vehicle antenna that is simple in structure, and can be readily mounted without tools.

A still further object of the present invention is to provide an ornament of this character that is relatively inexpensive to manufacture and is rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only, wherein like parts are referenced with like numerals for proper identification:

FIG. 1 is a perspective view of a combination ornament and identification marker for vehicles, showing the ornament mounted in a typical manner to a vehicle radio antenna;

FIG. 2 is a transverse cross-sectional view taken substantially along line 2—2 of FIG. 1;

FIG. 3 is a cross-sectional view taken substantially along line 3—3 of FIG. 1, showing the terminating end of the antenna secured between the two opposing marker members;

FIG. 4 is an elevational view of an alternative arrangement of the central groove and recess;

FIG. 5 is an elevational view of another embodiment of the invention, showing the pair of marker members in an open mode and secured together along adjacent edges, so as to establish a hinge connection therebetween; and FIG. 6 is a transverse cross-sectional view taken substantially along line 6—6 of FIG. 5.

DESCRIPTION OF THE PREFERRED EMBODIMENT

Referring to the embodiment as illustrated in FIGS. 1, 2 and 3, there is shown an ornamental device, generally indicated at 10, which is adapted to be fixedly mounted to a vehicle radio antenna 12. The present device is also used as an identification marker because the ornament can be readily seen when positioned on the antenna. When parked in a large crowded parking lot, cars and other vehicles are often difficult to locate. Thus, an identifying ornamental marker attached to the antenna allows one to readily find his vehicle.

The combination ornament/marker device as disclosed herein comprises a pair of marker members 14 and 14a which are formed having identical surface markings as well as identical shapes or configurations. That is, each member is formed having the same but opposite surface markings and configurations so as to be secured together to define a single ornament. As an example, members 14 and 14a are formed having predetermined, elongated, rectangular shapes, the outer surfaces 16 being integrally formed with indicia 17 defined by the letters USA vertically arranged thereon. Thus, it can be readily understood that various shapes or forms of the ornamental markers may be employed so as to allow other suitable indicia, markings or overall designs to be used as desired.

Preferably, each marker member is comprised of a suitable plastic body 18 having an inner mating surface 20, whereby the opposing surfaces of the two bodies 18 engage once the ornament is mounted to the antenna 12. In order to provide a complete engagement of the two bodies 18, each one is formed having a longitudinally disposed channel 22, as seen in FIG. 3. In this embodiment, channel 22 is centrally positioned in the inner mating surface 20 and extends upwardly from the bottom of the marker member to terminate in a concaved recess 24, the recess being formed so as to receive the enlarged tip member 25, generally found on the free end of an antenna. Thus, when the two marker members are affixed together, the opposing recesses define a hollowed sphere which captures the upper free end of antenna 12 within channel 22 and recesses 24.

Various means of securing the opposing members 14 and 14a are contemplated. However, the most suitable is to apply contact adhesive to the inner surface 20. It is further contemplated that suitable alignment means be provided whereby the two matching bodies 18 may be readily secured in perfect alignment, as seen in FIG. 2. The preferred alignment means as herein shown comprises a small dowel pin 26 projecting outwardly from surface 20 and a matching socket 28. When the marker members are aligned together on the antenna, their pins 26 will engage the respective aligned sockets 28.

Referring now to the embodiment illustrated in FIG. 4, there is shown a marker member having a centrally disposed channel 30 that extends the full length of inner surface 20, the recess 32 being positioned adjacent one end thereof. This will allow the ornament to be positioned in either direction on the antenna, or allow the ornament to be secured to the antenna just below the enlarged tip 25.

A third embodiment is also contemplated, as illustrated in FIGS. 5 and 6, wherein the two marker members 34 and 36 are integrally connected by a hinge means defined by web 38. Each member includes a channel 40 and a matching concave recess 42. However, in this arrangement one member is formed with an alignment pin 44 and the opposite member is formed with a matching socket 46. Since the members are hingedly interconnected by web 38, only one pin and one socket are required for alignment. Again, at least one inner surface can be provided with adhesive 50 and a protective sheet 52 which is peeled off when the ornament is to be affixed to antenna 12.

It should also be noted that the indicia 17 may be also molded as an integral part of each marker member, or the indicia may be provided by printing or affixing labels to the outer surface thereof.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. In combination, an ornament and identification device for vehicles, wherein the ornament is adapted to be secured to a radio antenna of said vehicle, said combination comprising:
    a first marker member having a predetermined configuration;
    a second marker member having a configuration for matching engagement with said first marker member;
    wherein each of said marker members includes an outer surface and an inner surface;
    an elongated channel centrally positioned in said inner surface of each marker member, wherein said antenna is secured within said channels when said marker members are fixedly engaged with each other about said antenna; and
    means provided on at least one inner surface for fixedly securing said ornament to said antenna.

2. The combination as recited in claim 1, wherein indicia is provided on the outer surface of said marker members and is established by the predetermined configuration of said marker members.

3. The combination as recited in claim 2, wherein said channel extends the full length of each of said marker members.

4. The combination as recited in claim 2, wherein said channel extends from one end of each of said markers and terminates adjacent the opposite end thereof, and includes an enlarged recess formed at said terminating end of said channel.

5. The combination as recited in claim 3, wherein an enlarged recess is formed within each of said channels.

6. The combination as recited in claim 4, wherein said indicia is integrally formed on said outer surface of each of said marker members 7. The combination as recited in claim 4, wherein said marker members include means for aligning said members when placed in engagement with each other.

8. The combination as recited in claim 7, wherein said securing means includes an adhesive coating on said inner surface of at least one of said marker members.

9. The combination as recited in claim 4, wherein said device includes a hinge means hingedly connecting said marker members together.

10. The combination as recited in claim 9, wherein said hinge means comprises a web member integrally connecting said marker members along adjacent edges thereof.

11. The combination as recited in claim 7, wherein said alignment means comprises a projecting pin member, and a matching socket member adapted to receive said pin member therein when said marker members are secured together.

* * * * *